United States Patent [19]

Mohondro

[11] Patent Number: 4,635,842

[45] Date of Patent: Jan. 13, 1987

[54] PROCESS FOR MANUFACTURING CLAD ALUMINUM-LITHIUM ALLOYS

[75] Inventor: William R. Mohondro, Dublin, Calif.

[73] Assignee: Kaiser Aluminum & Chemical Corporation, Oakland, Calif.

[21] Appl. No.: 694,359

[22] Filed: Jan. 24, 1985

[51] Int. Cl.$^4$ .............................................. B23K 20/00
[52] U.S. Cl. .................................... 228/175; 228/17; 228/193; 228/195; 228/231; 228/235; 228/263.17; 228/265; 420/528; 428/548; 428/555; 428/650
[58] Field of Search ................ 420/528; 428/548, 555, 428/650; 228/263.17, 17, 235, 231, 175, 265, 193, 195

[56] References Cited

U.S. PATENT DOCUMENTS

| | | | |
|---|---|---|---|
| 3,466,734 | 9/1969 | Vordahl | 228/217 X |
| 3,691,340 | 9/1972 | Landis et al. | 428/650 X |
| 3,756,789 | 9/1973 | Alder | 428/650 X |
| 3,917,151 | 11/1975 | Robinson | 228/217 X |

Primary Examiner—Stephen J. Lechert, Jr.
Attorney, Agent, or Firm—Andrew E. Barlay

[57] ABSTRACT

A metallurgical bond at the interface between an aluminum-lithium core alloy and a metallic liner is achieved by first forming a mechanical bond along the interface between the core and liner under moderated temperature and reduction conditions, and then heating the composite without simultaneous reduction to cause diffusion of the elements across the core-liner interface. The result is a metallurgical bond securing the layers together to form a composite which can be worked, shaped, and fabricated by normal reduction techniques into a full range of products without the discoloration and fouling problems otherwise typical of aluminum-lithium alloys.

12 Claims, No Drawings

PROCESS FOR MANUFACTURING CLAD ALUMINUM-LITHIUM ALLOYS

BACKGROUND OF THE INVENTION

This invention relates to aluminum-based alloys containing lithium as an alloying element. In particular, this invention relates to methods for bonding a lithium-containing aluminum core alloy to a metallic liner material to produce a clad product which can be worked and formed according to conventional aluminum processing techniques with no detriment to appearance or structural integrity.

Alloys of aluminum in which lithium is a major alloying element have the advantage of unusually low density when compared with other aluminum alloys. This has particular value in a wide range of applications, notably in the aircraft industry, where weight reductions readily translate into fuel savings.

Unfortunately, aluminum-lithium alloys are susceptible to fracture upon the application of stress, to a considerably greater extent than other aluminum alloys. To minimize this, lithium concentrations were originally held down to 1.5% or less (by weight). Nevertheless, the problem persisted. Indeed, the low limits on permissible lithium contents limited the percent reduction in density.

Modifications have been made in the alloy composition and processing procedures in attempts to overcome these problems. Typical disclosures are found in Evans et al., European Patent Application Publication No. 88,511 (published Sept. 14, 1983) and its counterpart U.K. Published Patent Application No. 2,115,836A (published Sept. 14, 1983), in which a specified composition range is stated to provide optimum properties including fracture toughness; Peel et al., European Patent Application Publication No. 107,334 (published May 2, 1984) and its counterpart British Patent Application No. 2,127,847A (published Apr. 18, 1984), specifying a composition including zinc for improved properties; Field, European Patent Application Publication No. 90,583 (published Oct. 5, 1983) and its counterpart British Patent Application No. 2,121,822A (published Jan. 4, 1984), which discloses specified homogenization procedures and compositional limitations to dissolve coarse copper-bearing phases in aluminum-lithium-copper-magnesium alloys; and Grimms, British Patent Application No. 2,126,936A (published Apr. 4, 1984) disclosing a technique for superplastic forming.

Some of these disclosures provide for higher lithium concentrations than the original alloys. Unfortunately, high concentrations tend to aggravate the reactivity problems already present at low concentrations. In particular, the amount of lithium oxide, carbonate and hydroxide formed at the alloy surface as a result of lithium's diffusion to the surface during high temperature processing is increased at high concentrations. These compounds stain the metal surface, detracting from the surface appearance. In addition, the lithium compounds form a fine powder on the surface, which is readily released to the atmosphere upon abrasion to cause a health hazard to workers and other persons in the vicinity. Still further, the oxide, carbonate and hydroxide compounds at the surface seriously interfere with the rolling techniques normally used to form the alloys into the final products. The water or oil used in the rolling process combines with the lithium oxide or carbonate on the surface to form further lithium hydroxide, which fouls the rolling equipment and causes slippage in the roll bite area.

A possible solution to these problems lies in cladding the alloy with a protective metallic liner, which would not only respond to a bright finish treatment for high reflectivity and resist surface oxidation, but would also provide cathodic protection to the core alloy, thus preventing it from exposure to corrosive environments. Cladding is not feasible, however, using conventional techniques. In particular, the elevated temperature usually used in roll bonding processes for cladding aluminum alloys merely heightens the rate of diffusion of lithium from the bulk of the core to the interface, creating lithium-containing compounds there and preventing the formation of a reliable bond.

SUMMARY OF THE INVENTION

It has now been discovered that a metallurgical bond at the interface between an aluminum-lithium core alloy and a metallic liner may be formed by simple diffusion heating once a mechanical bond between the core and the liner has been established. In preferred embodiments, the mechanical bond is formed by rolling the layers along contact surfaces comprised of freshly exposed metal at moderately elevated temperatures. In further preferred embodiments, the diffusion heating is done in a furnace at a temperature in the range of conventional homogenization or hot rolling procedures, without simultaneously working the layers. The heating is continued for a sufficient period of time to achieve a metallurgical bond along substantially the entire interface.

The result is a composite which can be worked, shaped and fabricated, using standard pass reductions, into a full range of products without loss of the strength of the interface bond, without discoloration, and without fouling of the rolls in the rolling mill equipment.

DETAILED DESCRIPTION OF THE INVENTION

The core alloys to which the process of the present invention is applicable are aluminum-based alloys with the following approximate ranges of alloying elements (expressed as weight percents):

| Lithium | 1.0–5.0%, preferably 1.5–3.0% |
| --- | --- |
| Copper | 0–5.0%, preferably 0–2.5% |
| Magnesium | 0–5.0%, preferably 0–2.0% |
| Zinc | 0–5.0%, preferably 0–1.0% |
| Zirconium | 0–0.5% |
| Manganese | 0–0.5% |
| Nickel | 0–0.5% |
| Chromium | 0–0.5% |
| Others | 0–0.05% each |

The liner material is a metallic substance capable of protecting the core alloy from atmospheric exposure, and preferably anodic with respect to the core alloy to further inhibit corrosion. High purity aluminum alloys which do not contain lithium are preferred. Examples of such materials are those of the 1000 series (Aluminum Association designation), having an aluminum purity of about 99% or higher, with iron and silicon being the major impurities. Specific examples include the alloys bearing the designations 1060, 1100, 1145, 1175, 1230 and 1235.

The thickness of the cladding layer is not critical. Indeed, the invention is applicable over the full range of thicknesses conventionally used in aluminum cladding. Any thickness which is effective in preventing exposure of the core to the atmosphere where oxidation or carbonate formation might occur, with a minimal increase in the density of the overall product may be used. In most applications, the cladding will generally range from about 1.5% to about 15% of the total thickness per side, with about 2% to about 10% providing the best results.

The surfaces to be contacted are prepared according to conventional techniques, to remove oxides, carbonates, hydroxides and all other compounds of the component metals from the surface, as well as grease, oil films and debris, leaving a surface consisting substantially entirely of the alloy metals in metallic form. Such conventional techniques include machine scalping, wire brushing and other abrasion techniques, etching in mild alkaline solutions, and the use of commercial degreasing solutions, followed by thorough drying.

Once the surfaces are prepared, the liner and core material are mechanically bonded together by rolling in a controlled manner, i.e., using controlled conditions of temperature, as well as careful control over the method and degree of thickness reduction. Conventional rolling procedures may be employed, generally consisting of tacking the leading edges of the mating surfaces together, followed by rolling along the composite surface from the tacked leading edges, using substantially uniform pressure along the length of the roll, to obtain substantially uniform adhesion between the core and liner over the contacting surfaces.

The temperature is moderated to prevent or at least minimize the diffusion of lithium to the surface of the core layer, and thus minimize the formation of lithium oxide or carbonate at the surface due to contact with the atmosphere. Accordingly, the rolling is done at a maximum temperature of about 450° F. (232° C.), but preferably high enough to enhance the flow of the liner stock with respect to the core, and to lessen the danger of cracking in the core during rolling. Thus, the preferred temperature range is from about 325° F. to about 425° F. (163°–218° C.). The temperature may be achieved by preheating the composite in a furnace prior to passing it through the rolling mill, for a length of time sufficient to achieve a uniform temperature throughout the composite. In general, a length of time corresponding to about one hour per inch of composite thickness will be sufficient.

The degree of reduction occurring in the initial mechanical bonding passes of the rolling process is controlled to cause the reduction to occur primarily in the liner rather than the core. By controlling the reduction in this manner, the liner will move relative to the core in order to create a mechanical bond, and cracking of the core will not occur. It should be noted that lithium-containing alloys are highly susceptible to cracking at temperatures contemplated for this step in the present invention. The degree of susceptibility, however, is highly dependent on the temperature during rolling, with the susceptibility decreased somewhat at temperatures toward the top of the ranges indicated above.

The overall degree of reduction and the number of passes used to achieve it are preferably controlled to cause a maximum of about 2% reduction in the core, preferably a maximum of about 1.5%. This may be achieved, for example, by using initial passes of less than about 2% reduction, preferably about 1%, to work the interface surface, with final passes of a greater reduction, ranging for example from about 2% to about 10%, depending on the thickness of the liner. When multiple passes are used, they are preferably made all in the same direction to enhance the strength of the mechanical bond. A mechanical bond is established when the layers physically adhere to each other along the interface, and yet are capable of a clean separation by the application of mechanical force to pull them apart. When the bond is strictly or primarily a mechanical bond, there is substantially no diffusion of aluminum atoms or atoms of the alloying elements from one layer to the other, and minimal diffusion of the alloying elements from the bulk of the layer to the interface.

Once the mechanical bond is formed by rolling, the composite is heated at a sufficient temperature and for a sufficient period of time to cause the component elements of the layers to diffuse across the interface to form a metallurgical bond between the layers. The term "metallurgical bond" is used herein according to its well known meaning among those skilled in the art, i.e., a bond which cannot be separated by mechanical force, and which is characterized by diffusion of the elements across the interface to form a continuous atomic matrix although still comprised of individual grains. The time and temperature of heating required to achieve the metallurgical bond are interdependent parameters. In general, effective results may be achieved by heating for a period of at least one hour per inch of thickness, preferably at least three hours per inch of thickness, at a temperature ranging from 600° F. to about 1200° F. (315°–648° C.), preferably from about 800° F. to about 1100° F. (426°–593° C.).

Diffusion heating is continued until the metallurgical bond extends across the majority of the interface, i.e., to the extent that any remaining interfacial regions are inaccessible to the atmosphere, and the liner and core will remain coextensive upon subsequent hot or cold rolling (i.e., substantially no liner rolloff occurs). In preferred embodiments, the entire interface is metallurgically bonded. If the metallurgical bond covers less than the entire interface, further bonding may be achieved by subsequent hot rolling to eliminate the gaps. This may be done under conventional hot rolling conditions typically used in aluminum working processes. Such conditions include temperatures ranging from about 600° F. to about 1200° F., preferably from about 800° F. to about 1100° F., and reductions up to about 90%.

Once the diffusion step has been completed, the product is a lightweight material capable of being formed and finished like other aluminum alloy products without the increased danger of corrosion or discoloration heretofore typical of aluminum-lithium alloys.

The following examples are offered for illustrative purposes only and are intended neither to limit nor define the invention in any manner.

EXAMPLE 1

A 1.0-inch (2.54 cm) thick block of aluminum-lithium alloy having the following composition (expressed in weight percents):

| | |
|---|---|
| Aluminum | 95.5% |
| Lithium | 2.4% |
| Silicon | 0.05% |
| Iron | 0.09% |
| Copper | 1.21% |
| Magnesium | 0.58% |

-continued

| | |
|---|---|
| Zirconium | 0.10% | was surface prepared by abrasion to expose fresh metal. A second block identical to the first was prepared by etching in caustic.

Sheet material of 1230 alloy having the following composition (in weight percents):

| | |
|---|---|
| Aluminum | 99.534% |
| Silicon | 0.10% |
| Iron | 0.28% |
| Copper | 0.03% |
| Manganese | 0.005% |
| Magnesium | 0.002% |
| Chromium | 0.007% |
| Zinc | 0.02% |
| Titanium | 0.01% |
| Vanadium | 0.008% |
| Nickel | 0.004% | was cold rolled to thickness of 0.021 inch (0.053 cm) and lightly abraded on one side. A piece of the 1230 sheet was placed on each side of each of the aluminum-lithium alloy blocks with the prepared surfaces of the 1230 sheet in contact with the core blocks. The materials in each composite was secured together by a weld bead at one end and wiring at the opposite end.

The two composites were then heated to 400° F. and maintained at that temperature for one hour. Then, while still warm, each composite was rolled using three passes at 1% reduction each, following by a single pass at 2% reduction. All passes were in the same direction.

The composite in which the core alloy had been prepared by abrasion was then examined by manually peeling the liner from the core and observing the surfaces which had been in contact. Considerable effort was needed to separate the liner indicating that a strong mechanical bond had been formed, but not a metallurgical bond. The exposed surfaces showed slight deformation but no discoloration which would have indicated oxide growth. Similar examination of the second composite yielded the same results, although only a small length of liner was peeled back to preserve the rest of the composite for further processing.

The second composite was then placed in a furnace which had been preheated to 900° F. (482° C.) and held in the furnace at that temperature for six hours. The composite was then removed from the furnace and permitted to cool to ambient temperature in air.

An attempt was made to peel off the liners by physical force as before but this proved impossible, indicating that a metallurgical bond had been formed.

The composite was then reheated to 900° F. (482° C.) and individual samples were hot rolled to final thicknesses of 0.484 inch (1.23 cm), 0.244 inch (0.62 cm), and 0.125 inch (0.32 cm). Examination of the samples after rolling indicated that the liner remained coextensive with the core. This is a further indication that the materials were metallurgically bonded prior to the hot rolling.

As a final test, the three samples were solution heat treated for periods of time corresponding to one hour per inch, then quenched in cold water. The purpose of this test is to check the liner for blisters which are caused by the release of hydrogen gas at the liner/core interface in regions where no mechanical bond had been formed, the blisters rising due to the thinness of the liner. No blistering or liner separation was detected.

EXAMPLE 2

The cladding procedure used in this example is one which is conventionally used on other wrought aluminum products to achieve a metallurgical bond. This example demonstrates the ineffectiveness of the procedure when used on an aluminum-lithium core material.

The core material and liner material of Example 1 were surface abraded and welded across the entry end on both sides. The liner stock in this case was 5% per side. The ends opposite the entry end were wired together to maintain contact between the liners and the core.

The resulting composite was heated to 800° F. (427° C.) and held at that temperature for one hour. Then, while still at that temperature, the composite was rolled in three passes at 1% reduction each, followed by one pass at 10% reduction, all in the same direction.

Physical force resulted in the peeling of the liner away from the core, indicating that a metallurgical bond had not been formed. The core alloy surface exposed by the peeling was dark dull grey in appearance indicating the presence of a considerable amount of oxide, and a similar pattern appeared on the exposed surface of the liner stock.

An unpeeled portion was then reheated to 800° F. (426° C.) and rolled in two passes, the first being a 5% reduction and the second a 7% reduction. The layers were still capable of separation by physical force, indicating the lack of a metallurgical bond even under these extreme conditions.

EXAMPLE 3

This example demonstrates the criticality of the limitation in core reduction in the initial rolling step of the process of the present invention.

A composite, using a 5% liner, was prepared in the same manner as that described in Examples 1 and 2. The composite was heated to 400° F. and held at that temperature for one hour. A single 20% pass rolling reduction was then performed while the composite was at temperature. Measurements of the product indicated the following:

| | |
|---|---|
| Total composite reduction | 15.98% |
| Liner elongation | 19.64% |
| Core elongation | 10.94% |
| Liner reduction | 15% per side |
| Core reduction | 16.3% |

Examination of the rolled product revealed a crack in the core alloy at a 45° angle with respect to the rolling direction. Another crack extended across the core-liner interface to penetrate both layers. The latter disturbed the flow of the liner stock.

No such cracks appeared in any of the other tests.

The foregoing description is offered primarily for illustrative purposes. It will be readily apparent to those skilled in the art that the particular materials and procedures described herein may be further varied or modified in numerous ways without departing from the spirit and scope of the invention as set forth in the following claims.

What is claimed is:

1. A method for effecting a substantially uniform adhesion of substantially all of the contacting surfaces of a lithium-containing core alloy with a metallic liner material, comprising the steps of:
   (a) preparing opposed surfaces of said core alloy and said liner material by removing therefrom substantially all oxide materials;
   (b) contacting said prepared surfaces to form a composite and tacking together the leading edges of each of said prepared surfaces;
   (c) roll bonding said composite from said leading edges to obtain substantially uniform adhesion along said contacting surfaces while causing at most a 2% reduction of said core alloy, at a temperature of up to about 450° F.; and
   (d) heating said roll bonded composite to form a metallurgical bond between said core alloy and said liner material along substantially all of said contacting surfaces.

2. A method in accordance with claim 1 in which the temperature in step (c) is from about 300° F. to about 450° F.

3. A method in accordance with claim 1 in which the temperature in step (c) is from about 325° F. to about 425° F.

4. A method in accordance with claim 1 in which step (c) is achieved by a plurality of successive rolling passes beginning with a sufficient number of passes at a total composite reduction of less than about 2% to secure at least a portion of said liner material to said core alloy.

5. A method in accordance with claim 1 in which the reduction of said core alloy in step (c) is at most about 1.5%.

6. A method in accordance with claim 1 in which step (d) is done at a temperature of from about 600° F. to about 1200° F. for at least about one hour per inch of composite thickness 7. A method in accordance with claim 1 in which step (d) is done at a temperature of from about 800° F. to about 1100° F. for at least about one hour per inch of composite thickness.

8. A method in accordance with claim 1 in which step (d) is done at a temperature of from about 800° F. to about 1100° F. for at least about three hours per inch of composite thickness.

9. A process according to claim 1 further comprising hot rolling said composite subsequent to step (d) at a temperature of from about 600° F. to about 1200° F.

10. A process according to claim 1 further comprising hot rolling said composite subsequent to step (d) at a temperature of from about 800° F. to about 1100° F.

11. A method for cladding a lithium-containing aluminum core alloy with a metallic liner material at least about 0.02 inch thick to form a composite of which said liner material comprises from about 1.5% to about 15% per side of the thickness thereof, said method comprising:
   (a) preparing opposed surfaces of said core alloy and said liner material by removing therefrom substantially all oxide materials;
   (b) contacting said prepared surfaces to form a composite and tacking together the leading edges of each of said prepared surfaces;
   (c) roll bonding said composite from said leading edges to obtain substantially uniform adhesion along said contacting surfaces while causing at most a 15% reduction of said core alloy, at a temperature of up to about 425° F.; and
   (d) heating said roll bonded composite to a temperature of from about 800° F. to about 1100° F. for at least about three hours per inch of composite thickness to form a metallurgical bond between said core alloy and said liner material along substantially all of said contacting surfaces.

12. A method for cladding an aluminum core alloy containing from about 1.0% to about 5.0% lithium with a metallic liner material at least about 0.2 inch thick to form a composite of which said liner material comprises from about 2% to about 10% per side of the thickness thereof, said method comprising:
   (a) preparing opposed surfaces of said core alloy and said liner material by removing therefrom substantially all oxide materials;
   (b) contacting said prepared surfaces to form a composite and tacking together the leading edges of each of said prepared surfaces;
   (c) roll bonding said composite from said leading edges to obtain substantially uniform adhesion along said contacting surfaces while causing at most a 15% reduction of said core alloy, at a temperature of up to about 425° F.; and
   (d) heating said roll bonded composite to a temperature of from about 800° F. to about 1100° F. for at least about three hours per inch of composite thickness to form a metallurgical bond between said core alloy and said liner material along substantially all of said contacting surfaces.

* * * * *